July 17, 1962  R. L. ENSINGER  3,044,308
TORSION PIVOT MEANS
Filed Feb. 29, 1960
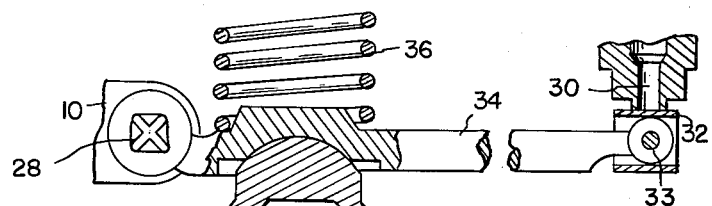
FIG. 4.
FIG. 5.
FIG. 1.
FIG. 2.
FIG. 3.
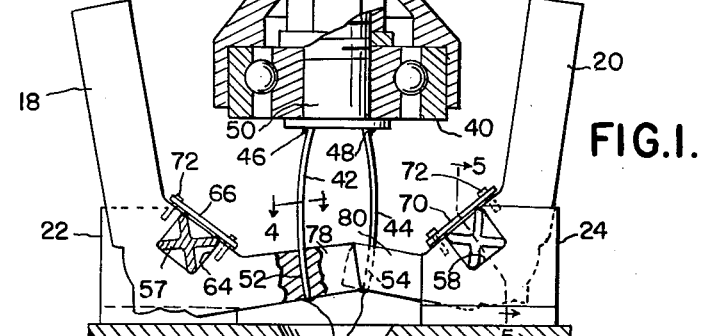
INVENTOR.
RAYMOND L. ENSINGER
BY
Whittemore, Hulbert &
Belknap
ATTORNEYS

United States Patent Office 3,044,308
Patented July 17, 1962

3,044,308
TORSION PIVOT MEANS
Raymond L. Ensinger, Detroit, Mich., assignor to Holley Carburetor Company, Van Dyke, Mich., a corporation of Michigan
Filed Feb. 29, 1960, Ser. No. 11,583
1 Claim. (Cl. 73—546)

This invention relates to precision performance control devices such as speed responsive flyweights and servo valves. More particularly, this invention relates to an improved torsion pivot bar or member for pivoting the movable member of a control device.

Before the adaption of torsion pivot members to centrifugal flyweight, each centrifugal flyweight was usually pivoted on individual lost motion types of pivots. The fact that there was motion between the various pivot elements and the flyweight caused errors to be introduced into the system. These errors were due to friction loss caused by the combination of rubbing and/or rolling of adjacent metal surfaces with the resulting accumulation of dirt and possibly corrosion between the surfaces. The undesirable effects of these errors was often considerable, particularly in view of the limited total movement and the repeatability required of the flyweight to properly perform its intended control function.

The art was advanced with development and utilization of a torsion pivot bar or member for pivoting the centrifugal flyweight. The member was not affected by any rubbing friction or contamination accumulation and in addition thereto, resiliently resisted the outward movement of the flyweight. The torsion bar consisted of a member having three drum-like portions spaced at substantially consecutive equal intervals by cross-like spring members. The outer drum portions were adapted to be rigidly retained by separate support members while the middle drum portion was rigidly secured within the flyweight member. The diameter of the drum portions were usually made wider than the width of the cross-like spring members. This particular form of torsion bar offers serious manufacturing problems since it is difficult to press the drum portions into the torsion bar while maintaining a particular relationship as between the respective details of the bar without creating undesirable preloads in the torsion bar. Preloads work adversely to the proper functioning of the torsion bar and prevent the flyweights or parts of the servo system connected thereto to operate efficiently and properly.

This invention has overcome the preload problem in that an improved design of torsion bar and method of retaining the bar are utilized. In brief, the torsion bar is a simple extrusion having a continuous cross-like section uninterrupted by any drum portions as previously described. The torsion bar is located in generally square channel-like cavities provided in the support members and in the flyweight member and retained therein by independent locking clamps which are removably mounted directly above the torsion bar. The clamps locate as well as retain the bar in an effective torsion position.

It is an object of the present invention to provide an improved torsion bar having the same cross-section for pivoting a centrifugal flyweight without the flyweight being affected by any rubbing friction or contamination accumulation.

Another object of the invention is to provide an improved torsion bar member having the same cross-like section throughout its entire length for pivoting a flyweight and at the same time resiliently resisting the outward movement thereof.

Still another object of the invention is to provide an improved torsion bar having the same cross-like section throughout its entire length and which is made from a simple extrusion without any preloads being incorporated therein.

A further object of the invention is to provide an improved torsion bar having a cross-like cross-section throughout its entire length and means for retaining the torsion bar in the proper position, said torsion bar being retained and locked in the cutout portions of the flyweight and support members by locking clamps mounted thereon.

Another object of the invention is to provide a precision performance mechanism utilizing a pair of support members, a flyweight member interposed between the support members, each of said support and flyweight members having a channel-like cavity in which is received an improved torsion bar, and clamping means on each of the members for retaining and locking the torsion bar in an operative position.

A still further object of the invention is to provide an improved torsion bar having a cross-like cross-section throughout its entire length, said bar being utilized for pivoting a precision performance mechansim which is subject to limited angular displacement and repeatability in a manner so that the mechanism is not affected by friction or contamination.

Other objects and features of the invention will become apparent as the description proceeds, especially when taken in conjunction with the accompanying drawing, illustrating a preferred embodiment of the invention, wherein:

FIGURE 1 is an elevational view shown partly in cross-section, of a centrifugal flyweight assembly which is constructed in accordance with the teachings of this invention. In addition thereto, FIGURE 1 also illustrates a servo valve mechanism embodying the improved torsion bar and retaining means.

FIGURE 2 is a perspective view illustrating the relationship of some of the essential elements comprising the flyweight assembly.

FIGURE 3 is an enlarged perspective view showing in greater detail the cross-section and the features of the improved torsion bar pivot means.

FIGURE 4 is a cross-sectional view taken on the line 4—4, FIGURE 1.

FIGURE 5 is a sectional view taken on the line 5—5, FIGURE 1.

Referring now in greater detail to the drawing, FIGURE 1 illustrates a housing 10 adapted to rotatably receive a shaft 12 which is driven by a transmission 14. A mounting plate 16, which may be formed as an integral part of shaft 12, is adapted to support the flyweight members 18 and 20, as by means of suitable support members 22 and 24. An improved pivot member or torsion bar is provided for each flyweight and is suitably secured in both the support members and the flyweight as will be hereinafter explained.

In order to illustrate a more complete structure having some utility and other applications of the invention, a servo orifice 30 is shown controlled by a servo valve 32 pivotally mounted at 33 on a moment arm 34. The arm 34 may be pivotally secured to a portion of the housing 10, as by a torsion bar 28. A spring 36 resiliently urges the arm 34 in a clockwise direction about pivot 28 so as to bear downwardly on an interfit with a generally spherical portion of a force transmitting member 38, the latter being operatively connected to the flyweight members 18 and 20 by means of a suitable ball bearing assembly 40 and the springs 42 and 44.

The spring members 42 and 44, in their preferred form, are column-type members having a generally rectangular cross-section, as illustrated in FIGURE 4. Ends 46 and 48 of springs 42 and 44 are suitably secured, in a rigid manner, to the coupling member 50, while the ends 52 and 54 are rigidly secured to the flyweights 18 and 20. Any method of securing these members, such as soldering, may be employed. Additionally, the ends 52 and 54 may be upset as at 56 if so desired.

As previously mentioned, the prior art construction of the torsion bar, consisted of three cylindrical drum-like portions which were spaced at substantially consecutive equal intervals by a pair of spring portions. The outer drum portions were adapted to be originally retained in the associated support members 22 as shown in FIGURE 2. The intermediate drum portion was adapted to be originally secured within the flyweight 18. However, this construction produced many manufacturing difficulties, the primary one being the incorporation of preloads in the torsion bar during the pressing of the drum portions therein.

In order to overcome these objections, an improved torsion bar 57 as shown in FIGURE 3 is utilized. The bar 57 is a simple extrusion and is constructed without preloads being incorporated therein. The torsion bar 57 has a cross-like cross-section and is of constant cross-section throughout its entire length. The bar 57 has in effect, four individual spring members which are integrally connected to provide the requisite torsion. The bar 57 offers a readily predetermined spring resistance to the twist of the arm 18.

Channel-shaped openings, recesses or cavities 58 are provided in the support members 22 and 24 for retaining the end portions 60 and 62 of the torsion bars 57 in fixed supported positions. Rectangular recess 64 is provided in each of the flyweight members 18 and 20. An intermediate portion of the torsion bar 57 is retained in the recess 64 and held in place by a locking clamp or plate 66. A pair of clamping plates 68 and 70 lock the end portions 60 and 62 in the recesses 58. FIGURES 1 and 2 show that the torsion bar 57 extends above the top edge of the recesses 58 and 64 so as to provide a small space between the clamp and its associated member. The clamping plates 66, 68 and 70 are brought to bear directly on the outer edge of the bar 57. The three clamping plates 66, 68 and 70 rest directly on the bar 57, said plates being secured to the flyweight member and support members by fastening means such as screws 72 so as to rigidly hold the torsion bar 57 in an effective position. The recesses 64 and 58, and locking clamps 66, 68 and 70 locate and retain the cross-shaped torsion bar 57 in a fixed supported position.

FIGURE 5 shows that the torsion bar flyweight 20 is spaced from the pair of support members 24. The only portions of the torsion bar 57 which twist or which resist rotation of the flyweight are the portions extending in between the supports and flyweight, as identified by numerals 74 and 76. Hence, the effectiveness of the torsion bar pivot mounting is determined by the spacing between the supports and flyweight.

The basic operation of the invention as disclosed in FIGURE 1 is quite apparent; that is, as the shaft 12 is rotated, the flyweights 18 and 20 move radially outwardly against the spring biasing force of torsion bars 57, thereby causing the flyweight arm portions 78 and 80 to move upwardly. As the arm portions 78 and 80 move upwardly, a force is transmitted through the springs 42 and 44 to the member 38 causing the arm 34 and valve 32 to move nearly close off servo orifice 30. It should be observed that as between the shaft 12 and coupling 50, there is no lost motion connection; all pivots and connections are made rigid so as to eliminate surface friction and prevent any accumulation of dirt particles as between any two cooperating surfaces. The same is of course, true as to the torsion bar pivot of arm 34.

The improved torsion bar is made from a pure extrusion having a continuous cross-section uninterrupted by any "drum" portions as utilized in the prior art construction. Since preloads have been eliminated from the manufacture of the improved torsion bar, the use of the improved bar has resulted in greater sensitivity in the actuation of the precision performance control devices.

The drawing and the foregoing specification constitute a description of torsion pivot means in such full, clear, concise and exact terms as to enable any person skilled in the art to practice the invention, the scope of which is indicated by the appended claim.

What I claim as my invention is:

A speed responsive centrifugal flyweight device comprising a shaft, means for rotating said shaft, a pair of longitudinally spaced support members carried by and rotatable with said shaft, means for pivotally mounting a flyweight member with respect to said support members in a manner providing for pivotal movement of said flyweight member with respect to said shaft, longitudinally aligned rectangularly shaped channels of a predetermined depth in said support and flyweight members, said means including an integral, combined pivot and torsion bar of uniform cruciform cross section throughout its entire length and which has a depth greater than the depth of each channel, said bar including four substantially flat leaves which occupy divergent planes, said bar providing longitudinally spaced portions which are received in said channels so as to seat the outer edges of two of said leaves in the corner portions of said channels, the outer edges of the two remaining leaves extending outwardly from said channels a predetermined distance, a clamp of rectangular configuration on each of said flyweight and support members, each clamp having portions thereon abutting the outer edges of said two remaining leaves of the pivot and torsion bar, and threaded fasteners connecting each clamp to its respective member to provide the requisite clamping pressure on said pivot and torsion bar to retain said longitudinally spaced portions in said channels against rotation, the portions of said bar intermediate the adjacent ends of said channels being subjected to torsion whenever said flyweight member is moved with respect to said support members upon the rotation of said shaft.

References Cited in the file of this patent
UNITED STATES PATENTS

| | | |
|---|---|---|
| 2,041,539 | Gaultier | May 19, 1936 |
| 2,238,380 | Almen | Apr. 15, 1941 |
| 2,465,098 | Inskeep | Mar. 22, 1949 |
| 2,883,140 | Stafford | Apr. 21, 1959 |

FOREIGN PATENTS

| | | |
|---|---|---|
| 610,669 | Great Britain | Oct. 19, 1948 |
| 613,044 | Great Britain | Nov. 22, 1948 |